United States Patent [19]

Okabayashi

[11] 4,225,005
[45] Sep. 30, 1980

[54] SETUP OF METER INDICATION DISPLAY IN AUTOMOBILE

[75] Inventor: Shigeru Okabayashi, Kamakura, Japan

[73] Assignee: Nissan Motor Company, Limited, Yokohama, Japan

[21] Appl. No.: 16,915

[22] Filed: Mar. 2, 1979

[30] Foreign Application Priority Data

Apr. 24, 1978 [JP] Japan .............................. 53/54297[U]

[51] Int. Cl.³ ............................................. B60K 37/02
[52] U.S. Cl. .................................. 180/90; 340/52 R; 340/366 R
[58] Field of Search ............. 180/90; 340/366 R, 382, 340/765, 762, 760, 79, 80, 525, 129, 145, 52 R

[56] References Cited

U.S. PATENT DOCUMENTS

| | | | |
|---|---|---|---|
| 3,053,337 | 9/1962 | Prohaska et al. | 180/90 |
| 3,174,576 | 3/1965 | Woofter et al. | 180/90 |
| 3,645,353 | 2/1972 | Cope et al. | 180/90 |

FOREIGN PATENT DOCUMENTS

| | | | |
|---|---|---|---|
| 2374182 | 8/1978 | France | 180/90 |
| 1401356 | 7/1975 | United Kingdom | 180/90 |

Primary Examiner—Robert R. Song

[57] ABSTRACT

A setup of meter indication display on an instrument board in an automobile, utilizing a panel type display unit such as a liquid crystal panel or an electroluminescence panel. To minimize unfavorable influence of brightness outside the car and to avoid interfering reflection of light rays incident upon the display panel, the front surface of the instrument board is recessed to provide a room, in which the display panel is disposed. The recessed areas of the instrument board surface are dark colored, and the display panel is supported by the use of, for example, a ball joint which allows the display panel to be swivelled and tilted.

7 Claims, 4 Drawing Figures

SETUP OF METER INDICATION DISPLAY IN AUTOMOBILE

BACKGROUND OF THE INVENTION

This invention relates to a setup of instrumental indication display on an instrument board in an automobile, utilizing a panel type indicator such as a liquid crystal panel or an electroluminescence panel.

Recently, panel type indicator units for the display of the indications of automotive meters are under development by utilizing panel type electronic display means such as liquid crystal (LC) panels, electroluminescence (EL) panels, electrochromic (EC) panels and plasma panels since this type of indication display units can be made very small in size, light in weight and simple in construction and accordingly are quite advantageous to automotive meters.

Common to these panel type indication display units, it is necessary to employ a sandwich structure comprising a planer display element (for example, a liquid crystal layer or an electroluminescence layer) sandwiched between two transparent layers such as glass plates or synthetic resin plates. Unlike glass plates for conventional automotive instruments, panel type indication display units of such a sandwich structure can hardly be produced as convex panels or concave panels on an industrial scale since the distance between the two transparent plates must be uniform over the entire area with extremely high precision, i.e. with tolerance only in the order of micron. In other words, panel type indication display units for automotive meters can be available only in the form of entirely and completely flat panel. When such a flat display unit is mounted on an instrument board in the same manner as the mounting of conventional meter indicators, there arises a problem that the reflection of light rays incident on the display face of the display unit through windows of the car is likely to interfere with the driver's recognition of the displayed indications. To avoid the interference by the reflected light thereby to confirm the displayed indications, the driver will be obliged to move his head so as to shift the positions of his eyes. This will present a serious inconvenience to the driver and will irritate him.

SUMMARY OF THE INVENTION

It is an object of the invention to solve the above explained problem about the applications of a panel type display unit to an automotive instrument.

It is another object of the invention to provide a setup of instrumental indication display on an instrument board in an automobile, utilizing a panel type display unit, which setup features that the reflection of light rays by the display unit to the driver's eyes can be avoided easily and surely.

According to the invention, a setup of instrumental display in an automobile comprises an instrument board which is recessed in a substantially vertical surface facing a seat so as to provide a recessed room, a meter indication display panel disposed in the recessed room, and a support means for supporting the display panel so as to face to the seat and allowing the display panel to be manually swivelled and tilted. The display panel has a planer display element, which exhibits an optical change in response to an electrical signal, interposed between two transparent plates. In the recessed room, surfaces of the instrument board around and above the display panel are dark colored.

An example of the support means is a ball joint mechanism including an anchor member fixed to the instrument board in the recessed room and a rod which is fixed at its one end to the display panel and can be turned on its axis and tilted towards the seat and reversely.

The instrument board should be construed as to imply an instrument board pad, too.

For example, the display panel may be principally a liquid crystal panel, an electroluminescence panel, an electrochromic panel or a plasma panel.

DESCRIPTION OF THE PREFERRED EMBODIMENTS

Figure 1:
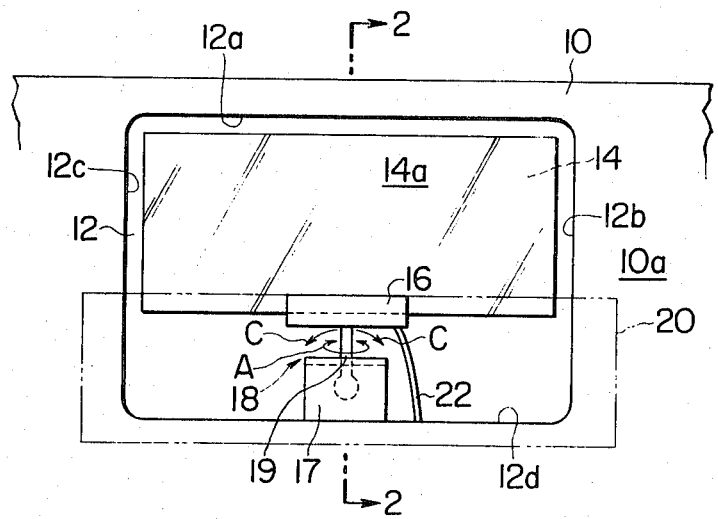
FIG. 1 is a front view of a setup according to the invention.
Figure 2:
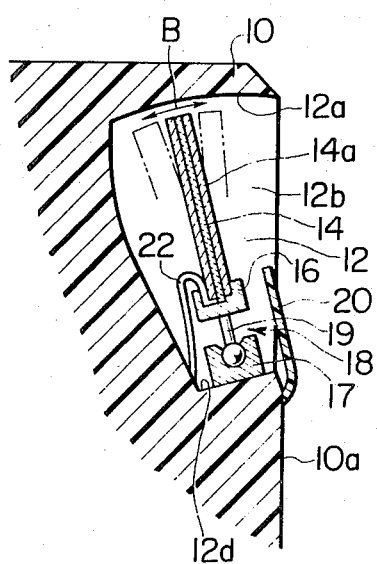
FIG. 2 is a sectional view taken along the line 2—2 of FIG. 1.

FIGS. 1 and 2 illustrate an embodiment of the present invention. Indicated at 10 is a pad of an instrument board in an automobile. (As mentioned hereinbefore, it is indifferent whether the article indicated by reference numeral 10 is the pad or the instrument board itself.) The instrument board pad 10 is recessed in a surface 10a facing to a driver's seat (not shown) so as to provide a room 12. In this room 12, a meter indication display panel 14 is mounted on a surface 12d, the base of the recessed room 12, so as to face to the driver's seat by the use of a ball joint 18. A lower edge portion of the display panel 14 is fixedly fitted into a holder 16, and the ball joint 18 includes an anchor portion 17 fixed to the pad 10 and a rod 19 which extends from the anchor portion 17 and is fixed at its upper end to the holder 16. The rod 19 can be turned on its axis in either direction as indicated by the arrow A in FIG. 1 and can be tilted both towards the driver's seat and reversely as indicated by the arrow B in FIG. 2, meaning that the display panel 14 can be swivelled and tilted manually. Furthermore, the rod 19 (hence, panel 14) can be tilted to the right and left as indicated by arrow C in FIG. 1.

In the room 12, surface 12a of the pad 10 above the display panel 14 and surfaces 12b and 12c respectively on the righthand and lefthand sides of the display panel 14 are curved and painted in dark color (e.g. black, brown, dark gray or gray) so as to give matt surfaces with the intention of darkening the display panel 14 as a whole and minimizing the influence of external light on the display face 14a of the display panel 14. Indicated at 20 is a cluster lid and at 22 are leads connected to the display panel 14.

As will be understood from the foregoing description, the driver can optionally swivel or tilt the display panel 14 to realize an orientation most appropriate both to the avoidance of unwanted reflection of light rays and to reading of the displayed indications.

In the case of conventional meter indicators of mechanical principles, it is difficult to arrange a plurality of indicators very closely due to restrictions by the mechanical elements. In contrast, electronic display panels such as liquid crystal panels, electroluminescence panels, electrochromic panels and plasma display panels are free from such restrictions. When electronic display panels are used for automotive instrumental display, therefore, it becomes possible to decrease the front surface area of the instrument board assigned to the meter indicators, in addition to the possibility of decreasing the thickness of the individual indicators. From the same reason, the display panel 14 in FIGS. 1 and 2 can be made small in surface area and can be located sufficiently distant from the front surface 10a of the instrument board pad 10. As a consequence, rays of light incident upon the display face 14a of the display panel 14 are reflected to the driver's eyes only when the angle of incidence falls in a narrow range of about 10 degrees. Therefore, avoidance of the reflection of light to the driver's eyes can be achieved by swivelling or tilting the display panel 14 only through about 5 degrees in the extreme case.

Figure 3:
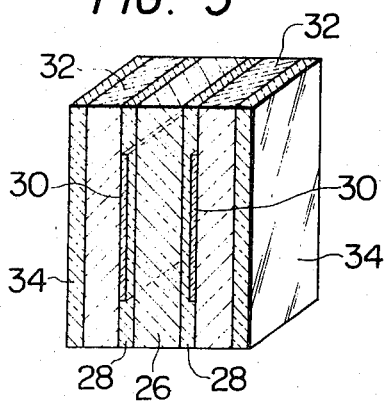
FIG. 3 is a schematic and perspective view of a liquid crystal panel.

FIG. 3 shows a liquid crystal panel as an example of known electronic display panels. A liquid crystal layer 26 is sandwiched between transparent glass plates 32 with the interposal of orientation adjustment films 28 and transparent electrode layers 30. The outside of each of the glass plates 32 is coated with a polarization layer 34.

Figure 4:
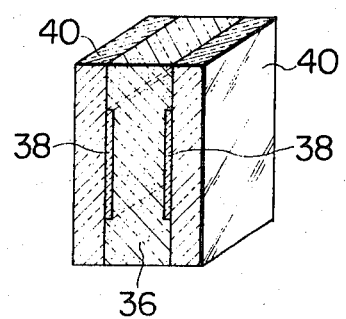
FIG. 4 is a similar view of an electroluminescence panel.

As another example of known electronic display panels, FIG. 4 shows an electroluminescence (EL) panel. A layer 36 of an electroluminescent material such as ZnS or CuS is sandwiched between glass plates 40 with the interposal of transparent electrode layers 38. An electrochromic (EC) panel, too, has the construction of FIG. 4 except that the middle layer (36) is of an electrochromic material such as $WO_3$ or $MoO_3$.

As will be understood from the foregoing description of a preferred embodiment, a setup according to the invention is advantageous in that the interference of light rays reflected by the display panel with the driver's recognition of displayed indications can be avoided easily and surely by slightly swivelling or tilting the display panel and that an undesirable influence of the brightness outside the car on the clarity of the display of meter indications is minimized by disposing the display panel in a recessed room in the instrument board, or a pad thereon, and dark coloring the board or pad surfaces in areas above and around the display panel. Besides, the smallness in thickness and suface area of the display panel makes it possible to provide a room for storage of something of small sizes behind the display panel or to arrange control buttons for certain devices on the front surface of the instrument board in a region close to the display panel.

The aforementioned glass plates in each electronic display panel may be replaced by transparent plates of a synthetic resin. The ball joint 18 in the illustrated embodiment is no more than an example of various known means for movably supporting a panel. As a different example, use may be made of a combination of a hinge for swivelling and another hinge for tilting. Since the weight of the display panel 14 is as small as about 300 g when the panel 14 is 7×10 cm wide, the display panel 14 can firmly be supported by a ball joint 18, or an alternative support means, with little possibility of moving by the influence of vibrations of the car.

What is claimed is:

1. A setup of instrumental display in an automobile, comprising:
   an instrument board which is recessed in a substantially vertical surface facing a seat so as to provide a recessed room;
   a meter indication display panel disposed in said room, said display panel having a planer display element, which exhibits an optical change in response to an electrical signal, interposed between two transparent plates; and
   a support means for supporting said display panel so as to face to said seat and allowing said display panel to be swivelled and tilted,
   surfaces of said instrument board defining said room and located above and around said display panel being dark colored.

2. A setup according to claim 1, wherein the dark colored surfaces of said instrument board are curved.

3. A setup according to claim 1, wherein said support means comprise a ball joint.

4. A setup according to claim 1, wherein said planer display element is a liquid crystal layer.

5. A setup according to claim 1, wherein said planer display element is an electroluminescent layer.

6. A setup according to claim 1, wherein said planer display element is an electrochromic layer.

7. A setup according to claim 1, wherein said display panel is a plasma panel.

* * * * *